Patented Jan. 2, 1923.

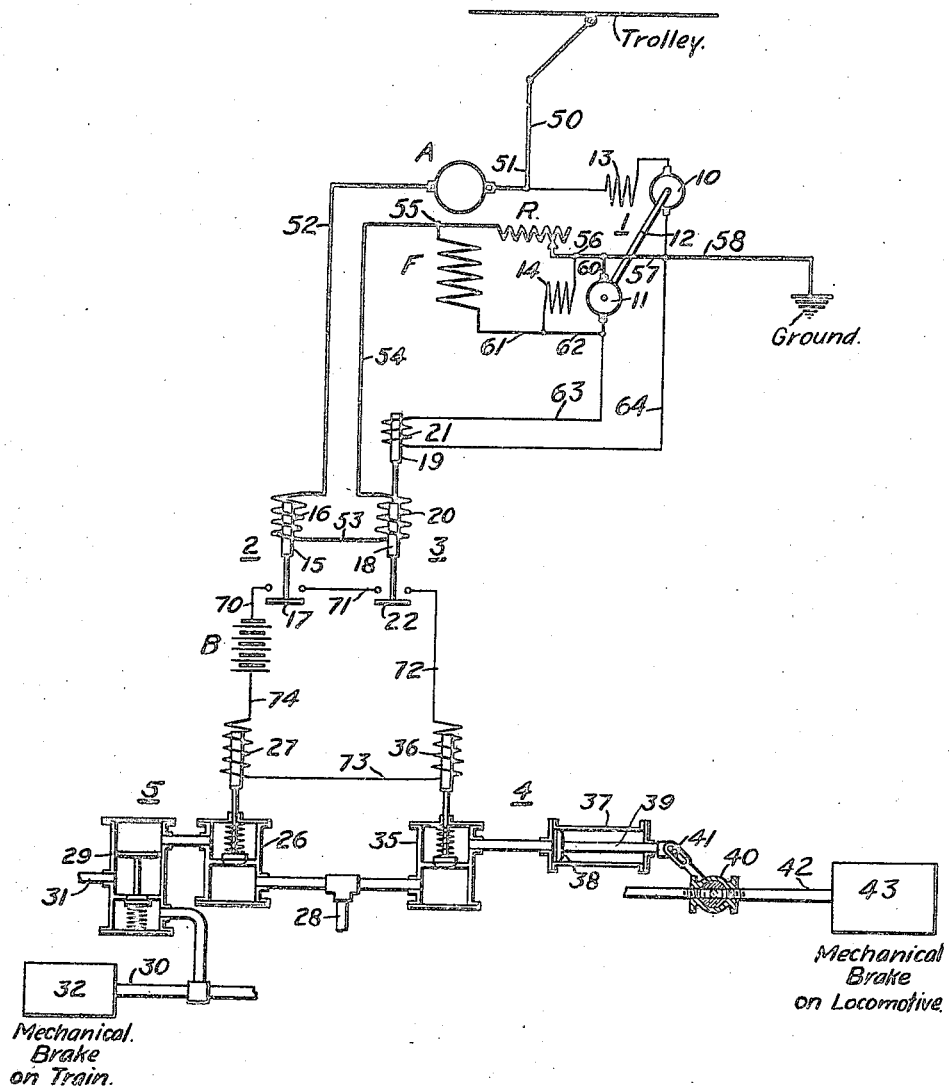

1,440,499

UNITED STATES PATENT OFFICE.

KARL A. SIMMON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed April 5, 1917. Serial No. 160,058.

*To all whom it may concern:*

Be it known that I, KARL A. SIMMON, a citizen of the United States, and a resident of Edgewood Park, in the county of Allegheny and State of Pennsylvania, have invented a new and useful Improvement in Systems of Control, of which the following is a specification.

My invention relates to systems of control and especially to regenerative braking systems for electric railway motors and the like.

The object of my invention is to provide a plurality of air-brakes or other mechanical braking systems that are located on different vehicles of a train and relay means, operative only under predetermined regenerative conditions, for effecting the operation of certain of the mechanical braking systems.

More specifically stated, it is the object of my invention to provide a regenerative braking system in connection with a locomotive and the train hauled thereby, or in connection with one or more motor-cars and the trailing vehicles drawn thereby, and a relay system, embodying a polarized relay, that is operative only under predetermined overload conditions during regeneration for automatically effecting the operation of the mechanical braking system on the train or the trailing vehicles only.

My invention may best be understood by reference to the accompanying drawing, wherein the single figure is a diagrammatic view of a system of control embodying my present invention.

Referring to the drawing, the system shown comprises supply-circuit conductors, Trolley and Ground; a main dynamo-electric machine having an armature A and a field winding F of the series type; a main-circuit variable resistor R; an auxiliary motor-generator set 1, or the like, that is driven from the supply circuit and is connected to excite the main field winding F during the regenerative period; an overload relay 2; a polarized relay 3 and a plurality of mechanical braking systems 4 and 5 of any suitable type that are respectively mounted upon the locomotive or motor-cars and upon the train proper or trailing vehicles.

The motor-generator set 1 is shown as comprising a driving or auxiliary motor armature 10 that is mechanically connected to an exciting or generator armature 11 by means of a shaft 12 or otherwise; a series-related field winding 13 for the auxiliary motor armature 10 and a shunt-excited field winding 14 for the auxiliary generator armature 11.

The high-current or overload relay 2 comprises a movable core or plunger 15 that is surrounded by an actuating coil 16 and is provided with a movable bridging contact member 17 that partially closes an auxiliary circuit (to be described) when the relay device occupies its upper position, which occurs, for example, when the regenerated current reaches a 50% overload value, the relay remaining in such upper position until the current has decreased to 25% overload current, for instance, or any other selected value.

The polarized relay 3 comprises a plurality of spaced core members 18 and 19 that are respectively provided with actuating coils 20 and 21 which, in this case, are energized in accordance with the regenerated current and from a substantially constant and uni-directional source, such as the auxiliary generator armature 11. It will be understood that the particular type of polarized relay employed is immaterial to my present invention and, if desired, a permanent magnet may be substituted for the actuating coil 21, in accordance with a familiar practice. A bridging contact member 22, that is actuated by the cores 18 and 19, is connected in series relation with the contact member 17 of the overload relay 2 for a purpose to be described.

The polarization of the relay 3 is such that the flow of regenerative current through the actuating coil 20 supplements the polarized effect produced by the actuating coil 21 and the relay lifts, for example, at 10% of the average regenerated current. Under accelerating conditions, however, the differential action of the reversed flow of current in the actuating coil 20 prevents the lifting of the polarized relay, which is thus operative only under predetermined regenerative conditions.

The mechanical braking system 5, which is associated with the train or trailing vehicles, comprises a normally closed valve 26 having a governing coil 27 for effecting the admission of fluid pressure from any suitable source (not shown) through a pipe or passage 28 to the valve 26 and thence to a second valve member 29 of the piston-operated type which, when opened, effects communication between a brake-pipe 30, or its equivalent, and the atmosphere through an outlet 31 of the valve 29. The brake-pipe 30 is associated, in the usual manner, with a pneumatic braking apparatus 32, the particular construction of which is immaterial to my present invention and, consequently, the apparatus is conventionally illustrated.

The mechanical braking system 4 on the locomotive or motor car comprises a valve 35 and a governing coil 36 similar to the valve 26 and the coil 27; a cylinder 37 communicating with the normally closed valve 35 and having a traveling piston 38, the stem or rod 39 of which is adapted to operate a valve 40 through the agency of a suitable lost-motion connection 41. The brake-valve 40 normally occupies the illustrated open position, whereby fluid pressure may be admitted via the customary braking pipes and engineer's valve, when desired, to a pipe or passage 42 and thence to the pneumatic braking apparatus 43 upon the locomotive or motor-car.

When the governing coil 27 of the mechanical braking system 5 is energized, fluid pressure is admitted through the valve 26 to the piston-valve 29, whereby the brake-pipe 30 is vented to the atmosphere through the outlet pipe 31, thus causing the application of the mechanical brakes upon the train, in accordance with familiar principles which need not be further discussed in the present application. However, it will be understood that, if desired, the energization of the governing coil 27 may be utilized to effect a direct application of fluid pressure to the mechanical brakes.

On the other hand, upon the energization of the governing coil 36 for the mechanical braking system 4, fluid pressure is admitted through the valve 35 to the cylinder 37, and the ensuing movement of the piston 38 causes the rotation of the valve 40 to its closed position, whereby the mechanical brakes upon the locomotive or motor car are temporarily prevented from being operated. As is well understood, the use of air-brakes or other mechanical braking systems upon a locomotive or motor-car during regenerative braking operation thereof tends to cause a slipping of the vehicle wheels and thus reduces the total effective braking effort of the locomotive or motor-car.

Assuming that regenerative operation of the main machine has been begun in any suitable manner, which is immaterial to my present invention, the main circuit is completed from the trolley through conductor 50, junction-point 51, main armature A, conductor 52, actuating coil 16 of the overload relay 2, conductor 53, actuating coil 20 of the polarized relay 3, conductor 54, junction-point 55, variable resistor R, which may be suitably manipulated as the vehicle speed gradually decreases to compensate for such decrease and thereby maintain a substantially constant regenerated current, and thence, through conductors 56, 57 and 58, to the negative supply-circuit conductor Ground.

The main-field-winding circuit is established from the positive terminal of the exciting or auxiliary armature 11, through conductors 60 and 56, main-circuit resistor R, junction-point 55, main field winding F and conductors 61 and 62 to the negative terminal of the exciting armature.

The auxiliary motor circuit is established from the positively-energized conductor 50 through the series-related field winding 13 and the armature 10 of the auxiliary motor and thence, through conductor 58, to ground.

The regenerative circuit connections just described form no part of my present invention except in so far as they perform a certain necessary function in co-operation therewith and are merely shown as representative of a regenerative braking system. The arrangement of circuits in question is fully set forth and claimed in a co-pending application of R. E. Hellmund, Serial No. 44,443, filed Aug. 9, 1915, Patent No. 1,298,706, granted April 1, 1919, and assigned to the Westinghouse Electric & Mfg. Company.

In the present instance, the terminals of the second actuating coil 21 for the polarized relay 3 are connected, through conductors 63 and 64, to the respective terminals of the auxiliary generator armature 11. However, if desired, a storage battery or other suitable source of energy may be substituted for the auxiliary armature or, as previously mentioned, a permanent magnet may be utilized in lieu of the actuating coil and its core.

Assuming that regenerated current for any reason rises to substantially 50% above the normal or average current or any other overload conditions corresponding to the setting of the relay 2 occur, the core 15 and the co-operating contact member 17 thereof will be actuated to their upper positions, whereby a circuit is established from one terminal of a battery B or any other suitable source of energy through conductor 70, bridging contact member 17 of the overload relay, conductor 71, bridging contact member 22 of the polarized relay 3, which, as previously stated, lifts at 10% of normal regenerative current, conductor 72, governing coil 36 for the mechanical braking system 4, conductor 73, governing coil 27 for the mechanical braking system 5 and conductor 74 to the other battery terminal.

Upon the energization of the governing coils 27 and 36 in the manner just set forth, the mechanical brakes 32 on the train proper or on the trailing vehicles are automatically applied, whereas the mechanical brakes 43 on the locomotive or motor cars are prevented from being operated, by reason of the previously described actuation of the respective mechanical braking systems upon the excitation of their governing coils.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with a plurality of mechanical braking systems located on different vehicles of a train, of a dynamo-electric machine located on one of said vehicles and adapted for both accelerating and regenerating operation, and relay means operative only under predetermined regenerative conditions for effecting the operation of certain of said mechanical braking systems.

2. The combination with a plurality of mechanical braking systems located on different vehicles of a train, of a dynamo-electric machine located on one of said vehicles and adapted for both accelerating and regenerating operation, and a relay system embodying a polarized relay operative only under predetermined regenerative conditions for effecting the operation of certain of said mechanical braking systems.

3. The combination with a plurality of mechanical braking systems located on a motor vehicle and a trailing vehicle, respectively, of a dynamo-electric machine located on said motor vehicle and adapted for both accelerating and regenerating operation, and relay means operative only under predetermined regenerative conditions for effecting the operation of the mechanical braking system on said trailing vehicle only.

4. The combination with a plurality of mechanical braking systems located on a motor vehicle and a trailing vehicle, respectively, of a dynamo-electric machine located on said motor vehicle and adapted for both accelerating and regenerating operation, and a relay system embodying a polarized relay operative only under predetermined regenerative conditions for effecting the operation of the mechanical braking system on said trailing vehicle only.

5. The combination with a plurality of mechanical braking systems located on different vehicles of a train, of a main dynamo-electric machine located on one of said vehicles and adapted for both accelerating and regenerating operation, a relay device having an actuating coil energized in accordance with the regenerated current, and a polarized relay device having an actuating coil similarly energized to supplement the polarizing effect under regenerative conditions, the concurrent occupation of certain positions by said relay devices effecting predetermined dissimilar operation of said mechanical braking systems.

6. The combination with a plurality of mechanical braking systems located on different vehicles of a train, of a dynamo-electric machine located on one of said vehicles and adapted for both accelerating and regenerating operation, a relay device having an actuating coil energized in accordance with the regenerated current to lift under relative heavy-current conditions, and a polarized relay device having an actuating coil similarly energized to supplement the polarizing effect under regenerative conditions and adapted to lift under normal current values, the concurrent occupation of lifted positions by said relay devices effecting the operation of certain of said mechanical braking systems.

7. The combination with a plurality of mechanical braking systems located on different vehicles of a train and each having a governing coil, of a dynamo-electric machine located on one of said vehicles and adapted for both accelerating and regenerating operation, a relay device having an actuating coil energized in accordance with the regenerated current, and a polarized relay device having an actuating coil similarly energized to supplement the polarizing effect under regenerative conditions, the concurrent occupation of certain positions by said relay devices effecting an energization of said governing coils to operate only one of the mechanical braking systems.

8. The combination with a plurality of mechanical braking systems located on a motor vehicle and a trailing vehicle, respectively, and each provided with a governing coil, of a dynamo-electric machine located on said motor vehicle and adapted for both accelerating and regenerating operation, a relay device having an actuating coil energized in accordance with the regenerated current to lift under relative heavy-current conditions, and a polarized relay device having an actuating coil similarly energized to supplement the polarizing effect under regenerative conditions and adapted to lift under normal current values, the concurrent occupation of lifted positions by said relay devices effecting the energization of said governing coils to operate only the mechanical braking system on the trailing vehicle.

In testimony whereof, I have hereunto subscribed my name this 29th day of March, 1917.

KARL A. SIMMON.